H. D. MORTON.
PORTABLE ELECTRIC ARC WELDING APPARATUS.
APPLICATION FILED MAR. 2, 1917. RENEWED NOV. 12, 1917.
1,278,985.
Patented Sept. 17, 1918.
3 SHEETS—SHEET 1.
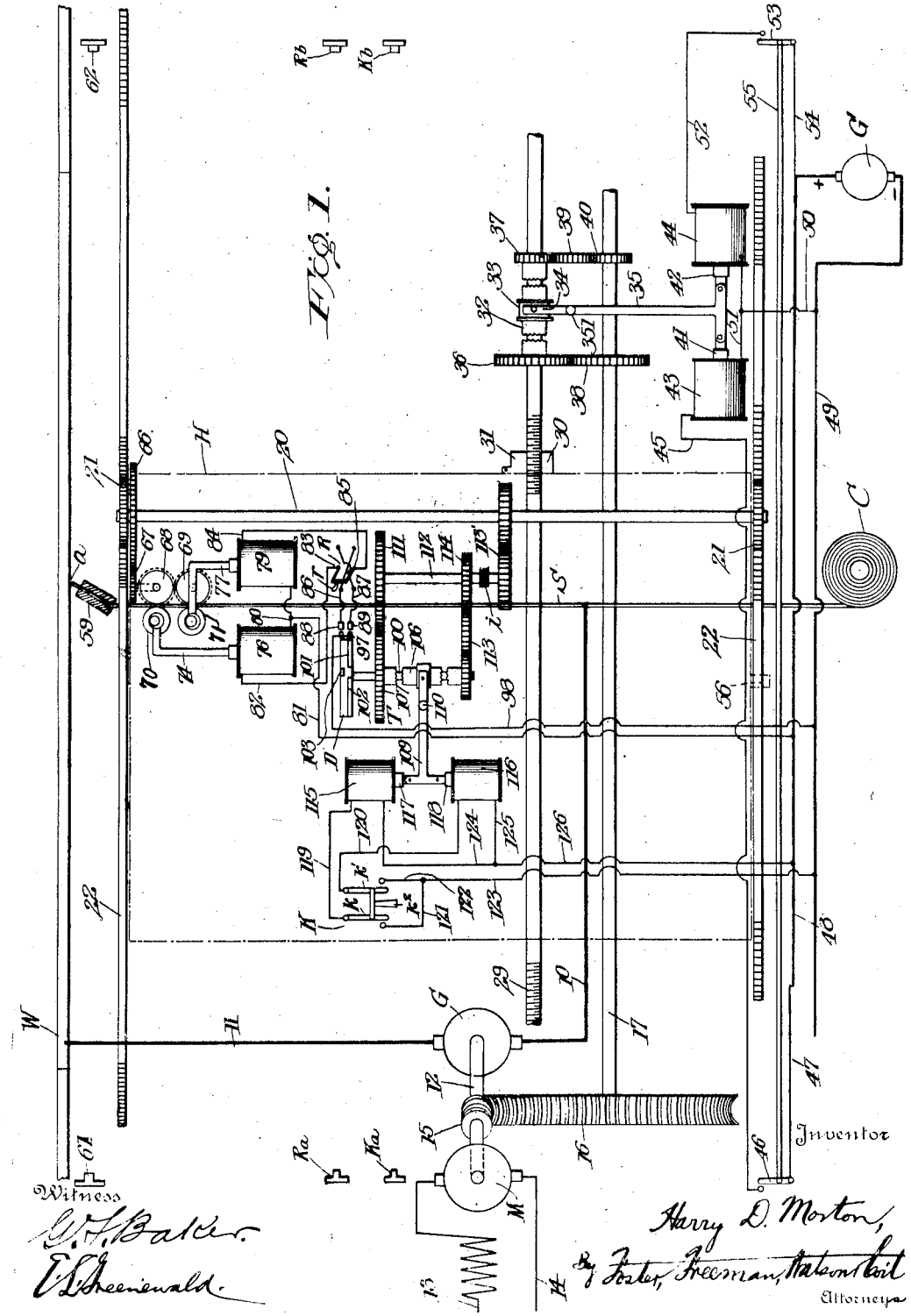

H. D. MORTON.
PORTABLE ELECTRIC ARC WELDING APPARATUS.
APPLICATION FILED MAR. 2, 1917. RENEWED NOV. 12, 1917.
1,278,985.
Patented Sept. 17, 1918.
3 SHEETS—SHEET 2.
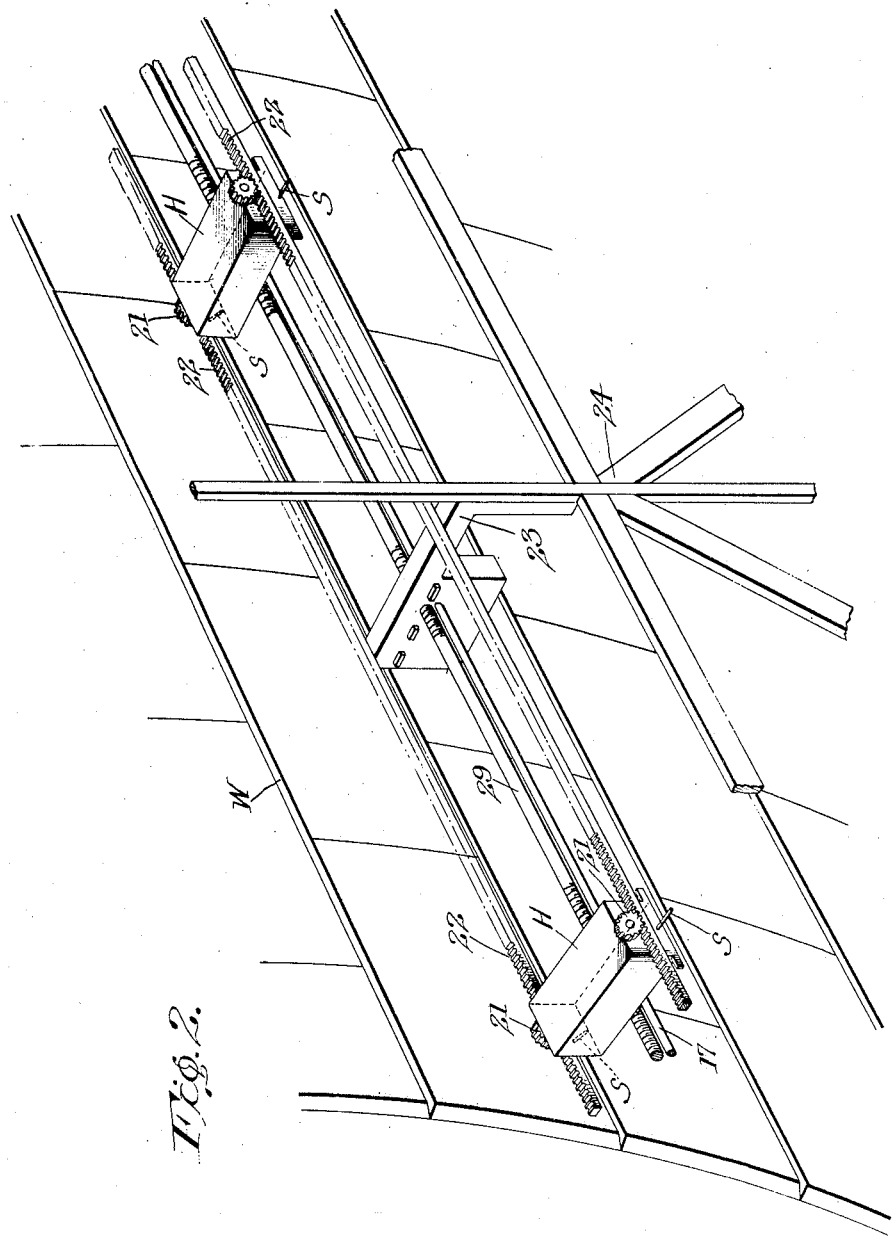

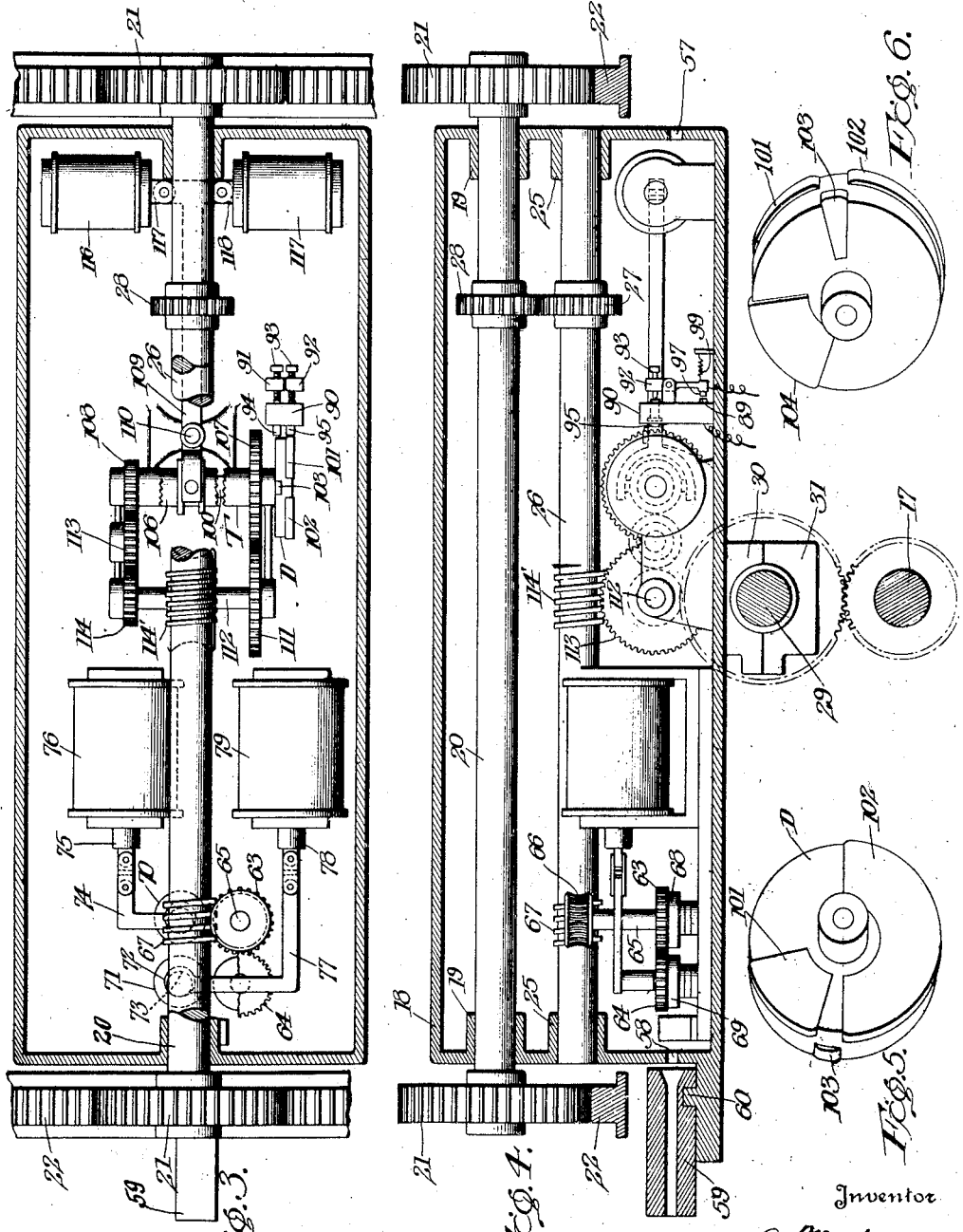

UNITED STATES PATENT OFFICE.

HARRY D. MORTON, OF DETROIT, MICHIGAN, ASSIGNOR TO AUTOMATIC ARC WELDING COMPANY, OF DETROIT, MICHIGAN, A CORPORATION OF MICHIGAN.

PORTABLE ELECTRIC-ARC-WELDING APPARATUS.

1,278,985.     Specification of Letters Patent.    Patented Sept. 17, 1918.

Application filed March 2, 1917, Serial No. 152,119. Renewed November 12, 1917. Serial No. 201,717,

*To all whom it may concern:*

Be it known that I, HARRY D. MORTON, a citizen of the United States, residing at Detroit, in the county of Wayne and State of Michigan, have invented certain new and useful Improvements in Portable Electric-Arc-Welding Apparatus, of which the following is a description.

My invention relates to the art of electric arc welding and has particular reference to a portable apparatus for use in metallic electrode automatic arc welding in which the work constitutes one electrode and a metallic welding strip or wire constitutes the other electrode.

The principal object of my invention is to provide an apparatus which may be readily moved from place to place and installed in position to electrically and automatically weld parts of large structures such as buildings, ships, railroad cars, boilers and the like which cannot easily be moved.

Another object of my invention is to provide a portable apparatus of the above description which is of simple and light construction so that it may readily be set up in place adjacent the work.

Another object of my invention is to provide a welding apparatus and driving mechanism therefor arranged so that the welding head which carries the welding strip feeding mechanism and controlling means therefor may be automatically reciprocated back and forth along the seam or part of the work to be welded in order that after the supporting structure and the welding head have been set up and the latter has been started the welder will operate automatically without attention until the weld is completed.

Another object of my invention is to provide mechanism by means of which the propelling means for the head may be automatically reversed at the opposite ends of the travel of the head and also to provide mechanism for maintaining the welding strip feeding means and the timing means for the feeding means in proper relation to the propelling means.

Another object of my invention is to provide a system of control for the welding strip feeding mechanism arranged so that the welding current or the amperage of the arc between the end of the feeding strip and the work will automatically control the welding speed of the feeding mechanism.

The above and other objects and the novel features of my invention will be apparent from the following description taken in connection with the drawing which forms a part of this specification and in which :—

Figure 1 is a diagrammatic plan view, looking from above, of a metallic electrode electric arc welding system embodying my invention;

Fig. 2 is a perspective view illustrating the utility of my invention and showing an electric welding mechanism embodying my invention mounted in place adjacent the work to be welded, such as a ship or the like;

Fig. 3 is a plan view of a portable welder embodying my invention, the cover of the welder being removed and portions of the shafts on the interior being broken away to more clearly illustrate the parts;

Fig. 4 is a side elevation of a portable electric welding head embodying my invention, showing the same mounted on supporting racks, one side of the casing being removed to show the feeding and timing devices on the interior; and Figs. 5 and 6 are perspective views of opposite sides of a timer disk by means of which the feeding mechanism of the welding head is controlled.

While I have shown the features of my invention as applied to a metallic electrode electric arc welding apparatus in which the work constitutes one of the electrodes and the metallic welding strip constitutes the other electrode, it is to be understood that certain of the principles and features of my invention are not limited to the specific type of apparatus here disclosed but are of broader application.

Referring to Fig. 1, G represents a generator for supplying suitable welding current to the welding circuit which includes the wires 10 and 11. The wire 10 is electrically connected to the welding strip S and the wire 11 may be directly connected to the metal plates W which constitute the work. It will be understood that the work may consist for example of two plates of a steel ship which plates are beveled at their abutting edges to form a groove at the seam to receive metal supplied by the welding strip S and fused by the arc at *a* between the end of the metal strip and the work W. The welding generator G is driven by a series wound motor M which is connected to the generator by a shaft 12. The motor M is supplied with current from some outside source such as from a set supply means by the wires 13 and 14. The motor shaft 12 carries a worm 15 which meshes with a worm gear 16 fixed on the line shaft 17. The line shaft 17 constitutes the means for driving the welding head H and the mechanism carried by it.

The welding head H shown in dotted lines in Fig. 1 and in full lines in the remaining figures includes a metal casing 18 provided with alined bearings 19 to receive a shaft 20 which extends through the casing 18 and projects beyond the opposite ends thereof. Toothed pinions 21 are mounted on the outer ends of the shaft 20 and are adapted to run on and mesh with the toothed racks 22 which are supported on brackets 23 of the supporting structure 24 which may be insulated adjacent the work. The casing 18 also has another pair of alined bearings 25 in which a shaft 26 is journaled. The shaft 26 carries a gear 27 which meshes with a gear 28 fixed on the shaft 20 and consequently when the casing 18 is propelled along the track consisting of the racks 22, 22 the pinion 21 will cause the shaft to turn and the latter will rotate the shaft 26 through the gears 27 and 28.

The mechanism for propelling the casing 18 along its track section consists of a screw shaft 29 which is adapted to be connected by gearing to the line shaft 17. The under side of the casing 18 has a half nut 30 fixed thereto whereby when the casing 18 is set in place on its track the threads of the half nut 30 will engage with the threads on the screw shaft 29. The fixed half nut 30 has a complementary half nut 31 pivoted to it and when the latter is swung up beneath the screw shaft 29 and clamped in place the screw shaft 29 will be adapted to propel the casing. The screw shaft 29 carries a clutch sleeve 32 which is splined to the screw shaft and which also has a groove 33 engageable by a yoke 34 on the shifter 35 fulcrumed at 35¹. The opposite ends of the clutch sleeve 32 are toothed to engage corresponding teeth on the gears 36 and 37 loosely mounted on the screw shaft 29. The gear 36 meshes with a gear 38 fixed on the line shaft 17 and the gear 37 meshes with an idler gear 39, the latter in turn meshing with a gear 40 fixed on the line shaft 17. It will be seen that when the sleeve 32 is shifted toward the right in Fig. 1 the screw shaft 29 will be driven in one direction and when it is shifted toward the left the screw shaft 29 will be driven in the reverse direction. Consequently the welding head H is propelled toward the right or left, depending on the position of the sleeve 32. The shifter 35 of the sleeve 32 is connected at its ends to the plungers 41 and 42 of the solenoids 43 and 44, respectively, which are located on opposite sides of the shifter. The solenoid 43 is connected by a wire 45 to one terminal of a switch 46, the other terminal of the switch being connected to a wire 47 to the conductor 48 of a cable carrying current for supplying the solenoids which operate the mechanism associated with the welding mechanism. The other conductor 49 of the solenoid cable is connected by the wires 50 and 51 to the other end of the winding of the solenoid 43. The solenoid 44 is connected by a wire 52 to one terminal of a switch 53, the other terminal of the switch being connected to the conductor 48 by the wire 54. The conductors 48 and 49 receive their current from some suitable source of power such as the generator G'. The switches 46 and 53 which control the solenoids 43 and 44 respectively are located at opposite ends of the travel of the welding head H and the switch blades thereof are rigidly connected together but insulated apart by a rod 55 so that when one of the switches is closed the other switch will be open. The switches 46 and 53 are closed by a stud 56 on the welding head H which engages insulated portions of one or the other of said switches when the head reaches the limit of its movement at the opposite ends of the track section upon which it is traveling.

The welding strip S is supplied from a coil c carried by an insulated support (not shown) moving with the welding head. The welding strip S is supplied to the feeding mechanism in the casing 18 through an opening 57 and passes out of the casing through an opening 58 and through a guide 59 swiveled at 60 on the front of the casing opposite the groove in the work to which the welding strip is fed. The guide 59 is swiveled so that it may assume and be locked in a position at an acute angle to the work W, and also so that by suitable stops 61 and 62 at the opposite ends of the track section upon which the head H travels the guide 59 can be thrown to either one of two angular positions, depending upon the direction in which the welding head H is to be driven.

The mechanism for feeding the welding strip S from the head H to the arc to maintain the latter and to deposit welding material on the work includes two gears 63 and 64 which mesh with each other and rotate in opposite directions as indicated by the arrows. The gear 63 is fixed on a shaft 65 which carries a worm gear 66 at its upper end meshing with a worm 67 on the shaft 26. The gears 63 and 64 also carry the feed rolls 68 and 69, both the faces of which are provided with ribs to better grip the welding strip 7. Normally both of the feed rolls 68 and 69 are rotating but they do not engage the welding strip S unless the latter is forced against either one of said feed rolls by either one of the idler rolls 70 or 71 which are journaled directly opposite the feed rolls 68 and 69 respectively and also have gripping faces to engage the wire. Each of the idler rolls 70 and 71 is carried by an eccentric sleeve 72 mounted on a stud 73. The sleeve 72 of the idler roll 70 is also secured to the outer end of an arm 74 connected to the plunger 75 of a solenoid 76. The eccentric sleeve of the idler roll 71 is rigidly connected in the same manner to an arm 77 which is connected to the plunger 78 of another solenoid 79. Thus when the solenoid 76 is energized the idler roll 70 will force the welding strip against the feed roll 68 and when the solenoid 79 is energized the idler 71 will force the welding strip against the feed roll 69, thereby providing a feeding mechanism which will feed the welding strip either toward or away from the work as the welding conditions require.

Referring to Fig. 1 it will be seen that corresponding ends of the windings of the solenoids 76 and 79 are connected together by a wire 80 and this wire is connected by a wire 81 to the conductor 48 of the cable which supplies current to operate the solenoids. The other end of the winding of the solenoid 76 is connected by a wire 82 to the middle terminal 83 of a reversing switch R and the other end of the solenoid winding 79 is connected by a wire 84 to the terminal 85 of the reversing switch R. The cross connected contacts of the reversing switch R are connected by the wires 86 and 87 to contacts 88 and 89, respectively, and the current through these contacts 88 and 89 is controlled by a timing mechanism T.

The timing mechanism T determines the times at which the solenoids 76 and 79 are rendered operative and inoperative in Figs. 3 and 4, the timing mechanism being shown as contained within the casing 18 of the portable welding head. A standard 90 fixed to the casing 18 carries a pair of pivoted clappers 91 and 92 which carry screws 93 at their upper ends engageable by spring pressed plungers 94 and 95 operated by the several cams on the cam disk D. The lower ends of the clappers 91 and 92 carry the contacts 96 and 97 respectively which are electrically connected together and to a wire 98 which is connected to the conductor 49. The contacts 96 and 97 are normally held out of contact with the contacts 88 and 89 by springs 99 secured to the clappers 91 and 92 and the said contacts on the clappers are moved against the fixed contacts 88 and 89 by cams on the cam disk D, the opposite sides of which are shown in perspective in Figs. 5 and 6. The cam disk D is mounted on the end of a shaft 100 carried by suitable bearings. One side of the cam disk D carries the cam segments 101 and 102, the edges of which extend a slight distance above the peripheral face of the disk D so as to engage the knife edge carried by the plunger 95 on the standard 90. The cam disk D carries the cam segments 103 and 104 on its opposite side and on the opposite side of a plane passing transversely of the disk D and perpendicular to the axis thereof. The cam segments 103 and 104 are adapted to engage the knife edge of the plunger 94 and cause the contact 96 to move against the contact 88. Thus when the reversing switch R is thrown to the right in Fig. 1 and the contacts 88, 96 and 89, 97 are closed in their proper relation, with the feed rolls 68 and 69 rotating in the directions of the arrows the solenoids 76 and 79 will be energized in proper relation as the cam disk D rotates to cause the feed rolls 68 and 69 to become active at the proper moments to first feed the welding strip to the work to close the welding circuit then to reverse the feed of the welding strip to draw the arc, then to again feed the welding strip toward the work to maintain the arc and supply welding material thereto to be deposited upon the work and when the weld is completed to reverse the feed of the welding strip to rupture the arc. The driving mechanism of the cam disk D includes a clutch sleeve 106 splined on the shaft 100 and provided with clutch teeth at its opposite ends to engage corresponding clutch teeth on the hubs of the gears 107 and 108 which are loosely mounted upon the shaft 100. A clutch shifter 109 pivoted at 110 has a yoke at one end which fits a groove in the clutch 106 and when the shifter 109 is moved out of neutral position the clutch teeth of the sleeve 106 will engage either the teeth on the gear 107 or the teeth on the gear 108 to cause the shaft 100 to be driven thereby. The gear 107 meshes with a gear 111 carried by the shaft 112 and the gear 108 meshes with an idler gear 113 which latter meshes with a gear 114 also mounted on the shaft 112. The shaft 112 also carries a worm gear 113' which is driven by a worm 114' on the shaft 26 and this shaft as shown in Fig. 4 particularly is driven by suitable gears from the shaft 20. The shaft 112 carries an insulating coupling *i* which insulates the timer mechanism T from the feeding mechanism and welding strip S. It will be understood that when the welding head H is moving in one direction and the shaft 20 is rotating to correspond with that direction the shaft 112 will be driven in a given direction and when the head H is reversed the shaft 20 will also rotate in a reversed direction which will cause the shaft 112 to also reverse its direction of rotation. However, it is essential that the cam disk D rotate always in the same direction and consequently the reversing mechanism shown is provided and the sleeve 106 in one clutching position will cause the shaft 100 to be driven in the proper direction and when the welding head H reverses its direction of movement the sleeve 106 will be thrown into reversing position so that the cam disk D will continue to rotate in the proper direction.

The action of the clutch sleeve 106 is controlled by two solenoids 115 and 116 which have plungers 117 and 118 connected to the T-shaped end of the shifter 109. When the solenoid 115 is energized the clutch sleeve 106 will engage the hub of the gear 108 and when the solenoid 116 is energized the sleeve 106 will engage the hub of the gear 107. The corresponding ends of the windings of the solenoids 115 and 116 are connected by the wires 119 and 120 to corresponding terminals of a switch K which has two blades $k$ and $k'$ and a handle $k^2$. The other terminals of the switch K are connected by the wires 121 and 122 to a wire 123 which leads to the conductor 49. The opposite ends of the windings of the solenoids 115 and 116 are connected by the wires 124 and 125 to a wire 126 which leads to the other conductor 48 of the cable which supplies current for operating the solenoids.

When the head H reaches the end of its travel the reversing switch R will be thrown from either one of its closed positions to the other closed position by the stops $r^a$ and $r^b$ located at suitable positions at opposite ends of the track section upon which the head H travels and arranged so as to engage the handle $r$ of the reversing switch R. When the head reaches either end of the track section upon which it travels the reversing switch K will also be thrown from one of its closed positions to the other by one of the stops $k^a$ or $k^b$, which stops are located in a position to engage the handle $k^2$ of the switch K.

It is contemplated that each of the welding heads shall travel back and forth over a certain section of track installed as shown in Fig. 1 beside the work, as for instance in a dry dock. The welder is designed to deposit molten metal supplied by the welding strip which it feeds into a groove between two plates until such groove is entirely filled. Inasmuch as the plates required to be welded together would usually be so thick that it would not be expedient to undertake to fill the groove between them in one pass I have devised means as heretofore described whereby any desired number of layers of welding material may be deposited in the groove.

The operation of one of the portable welders is briefly as follows, referring to Fig. 1 and assuming that the motor M is running, that the switches 46, $k'$, are closed and that the reversing switch R is closed to the right. The solenoid 43 is therefore energized and the clutch which it controls will be arranged so that the line shaft 17 rotates the lead screw 29 through the gears 40, 39 and 37 to drive the welding head H toward the right. Since the switch $k'$ is closed the solenoid 116 will be energized and the sleeve 106 will be in clutch with the gear 107, causing the cam disk D of the timer T to rotate in the proper direction for feeding the welding strip S to the work W. Since the reversing switch R is closed to the right the solenoid 76 will act as the direct feed solenoid and feed the welding strip S to close the welding circuit and also after the arc has been drawn to again feed the welding strip to the work to maintain the arc and also to supply welding material to the arc to be deposited in the groove on the work. In this position of the reversing switch R the solenoid 79 will act as the reverse feed solenoid and at the proper time the cam segments on the cam disk D will cause this solenoid to act to draw the arc and also to rupture the arc.

The welding head H continues to be fed toward the right by the lead screw 29 until it reaches the end of its welding section. At the end of its travel toward the right the welding head H is reversed when the stop 56 thereon throws the switch 46 out and throws the the switch 53 in. This action deënergizes the solenoid 43 and energizes the solenoid 44 causing the clutch sleeve 32 to mechanically connect the gear 36 to the lead screw 29 so that the line shaft 17 will drive the lead screw 29 through the gears 38 and 36 thus reversing the direction of rotation of the lead screw and causing the welding head H to be driven to the left. The travel of the welding head H toward the left reverses the direction of rotation of the shaft 20 which reverses the direction of rotation of the shaft 112 geared to the cam shaft 100. This would cause the cam disk D to be rotated in an opposite direction to that in which it was formerly rotated. Since the cam disk must at all times rotate in the same direction means are provided for compensating for this reversal and when the welding head H reaches the end of its travel toward the right the switch K is thrown to the left by the stop K$b$, throwing out the switch $k'$ and throwing in the switch $k$. This action deënergizes the solenoid 116 and energizes the solenoid 115 causing the clutch sleeve 106 to be moved into engagement with the clutch portion of the gear 108. Since this gear is driven by a gear 113 intermediate the gears 114 and 108 the rotation of the cam shaft 100 will be re-reversed so that the cam disk D will continue to rotate in the same direction as it did before the welder reversed its travel.

The rotation of the shaft 20 also reverses the direction of rotation of the feed rolls 68, 69 and instead of the feed roll 68 being the direct and re-direct feed roll it now becomes the reverse feed roll to draw the arc and to rupture it at the proper time. The feed roll 69 is also reversed and becomes the direct feed roll to feed the welding material to close the welding circuit and also to feed the welding strip S at the proper time and for the proper period to maintain the arc and supply welding material thereto to be fused and deposited in the groove on the work. In order to compensate for the reversal of the rotation of the feed rolls 68, 69 the reversing switch R is provided. This switch R is thrown to the left by the stop R$b$ when the welding head H reaches the end of its travel, which renders the solenoid 79 the direct feed solenoid and the solenoid 76 becomes the reverse feed solenoid. As a consequence of the throwing of the switches K and R the timing mechanism T and the welding strip feeding mechanism continue to operate in the same way as if the welding head had not been reversed. At the same instant that the switches 53, K and R are operated by their operating stops, the stop 63 throws the pivoted guide to its other angular position with respect to the work. When the welding head reaches the end of its travel in the opposite direction the stops 61, K$a$ and R$a$ operate the guide 59, switch R, and switch K respectively, and the stop 56 on the welder closes the switch 46 and simultaneously opens the switch 53 again reversing the direction of travel of the welder and also reversing the timing mechanism and feeding mechanism to correspond.

Since the motor M drives the generator G which supplies the welding current and also drives the line shaft 17 which propels the welding head H and drives the timing and feeding mechanisms, the feed of the welding strip or wire S is automatically controlled and equilibrium is maintained between the rate of fusing of the welding material and the rate at which the welding material is fed to the arc. If the shortening of the arc and the consequent rise in amperage causes the wire to fuse too rapidly, or even rapidly enough to prevent short circuiting, the arc will, itself, maintain an equilibrium within a limited range but when the composition or constitution of the welding strip is such that it melts slowly, the uniformly moving feed rolls deliver the welding strip to the arc faster than the arc can fuse it,—and this, in spite of the fact that the shortening of the arc causes a considerable rise in amperage. The series motor M then automatically responds and feeds the wire more slowly and allows the arc to regain its normal length. It will be understood that during the operation of the welder, when the arc at $a$ shortens the resistance of the welding circuit decreases, the amperage rises and this rise in amperage may not be sufficient to fuse the wire fast enough to prevent its short circuiting on the work. When this condition arises the load on the generator G is increased and the load on the motor increases proportionally causing the latter to slow down and drive the line shaft 17 at a slower speed. The welding head H will, therefore, be propelled more slowly and the arrangement and proportions of the gears for driving the timing mechanism T and the feeding mechanism are such that their speed will be reduced in greater proportion. This slower feed of the welding strip S continues until normal conditions again obtain at the arc $a$. Conversely, when the arc at $a$ lengthens the resistance of the welding circuit increases, the amperage supplied by the generator G decreases and the load on the motor M decreases proportionally. As a consequence the motor M tends to speed up, driving the line shaft 17 faster and causing the lead screw 29 to propel the welding head H more rapidly. As the welding head H moves more rapidly the shaft 20 will also rotate faster and drive the feed rolls and the cam disk D faster causing the welding strip S to be fed more rapidly to the arc $a$ until the arc is finally restored to its normal length when the motor M will be rotating at its normal speed. The equilibrium between the rate of welding strip feed and the rate of fusing may be automatically maintained in other ways than the way which I have described and a number of other ways and devices by means of which this may be done will be found in my copending application relating to electric arc welding.

While I have shown and described my invention in detail it will be apparent that many changes may be made therein without departing from the spirit of the invention, and therefore I do not wish to be limited to the exact methods or devices disclosed.

Having described the invention, what is claimed and desired to be secured by Letters Patent is:

1. In an automatic arc welding apparatus in which the work constitutes one electrode and a metallic welding strip constitutes the other electrode, the combination of a welding head, means for reciprocating the work and welding head relatively to each other, and means for continuously feeding a welding strip from said head to the work during the operation of said reciprocating means to maintain the arc and to supply welding material to be deposited on the work.

2. In an automatic electric arc welding apparatus in which the work constitutes one electrode and a metallic welding strip constitutes the other electrode, the combination of a welding head, mechanism for continuously and unintermittently reciprocating the welding head back and forth along a seam or groove on the work, and mechanism for feeding a welding strip from said head to said seam or groove during the reciprocation of said head to maintain the arc and to supply welding material to be deposited on the work.

3. In an automatic electric arc welding apparatus in which the work constitutes one electrode and a metallic welding strip constitutes the other electrode, the combination of a welding head, means for moving said head in a path at a fixed distance from said work, and automatically acting means for continuously feeding a welding strip to the work from said head while the latter is moving and after the arc is formed, so as to maintain the arc and also supply welding material to be deposited on the work.

4. In an automatic electric arc welding apparatus in which the work constitutes one electrode and a metallic welding strip constitutes the other electrode, the combination of a welding head, mechanism for reciprocating said head in a path at a fixed distance from said work, and mechanism on said head for continuously feeding a welding strip to the work from said head while the latter is being reciprocated, so as to maintain the arc and also supply welding material to be deposited on the work.

5. In an automatic electric arc welding apparatus in which the work constitutes one electrode and a metallic welding strip constitutes the other electrode, the combination of a track, a welding head supported on said track, mechanism for moving said head along said track, and mechanism on said head for continuously and unintermittently feeding a welding strip to the work from said head while the latter is moving and after the arc is formed, so as to maintain the arc and also to supply welding material to be deposited on the work.

6. In an automatic electric arc welding apparatus in which the work constitutes one electrode and a metallic welding strip constitutes the other electrode, the combination of a welding head, mechanism for propelling said head along the work, mechanism for feeding a welding strip to the work from said head while the latter is being propelled, so as to maintain the arc and supply welding material to be deposited on the work, and means for reversing the propelling means at the opposite ends of a predetermined path.

7. In an automatic electric arc welding apparatus in which the work constitutes one electrode and a metallic welding strip constitutes the other electrode, the combination of a welding head, mechanism for propelling said head along the work, mechanism for feeding a welding strip to the work from said head while the latter is being propelled, so as to maintain the arc and supply welding material to be deposited on the work, means for reversing the propelling means at the opposite ends of a predetermined path, and means for controlling the speed of the propelling mechanism.

8. In an automatic electric arc welding apparatus in which the work constitutes one electrode and a metallic welding strip constitutes the other electrode, the combination of a welding head, mechanism for propelling said head in a path at a fixed distance from said work, mechanism for feeding a welding strip to the work from said head while the latter is being propelled, so as to maintain the arc and also to supply welding material to be deposited on the work, means for automatically reversing said propelling means at the opposite ends of its path, and means for automatically changing the angle which the welding strip makes with the work when the direction of the propelling mechanism is reversed.

9. In an automatic electric arc welding apparatus in which the work constitutes one electrode and a metallic welding strip constitutes the other electrode, the combination of a welding head, means for propelling said welding head in a path along the work, means for feeding a welding strip to the work from said head while the latter is being propelled, a guide for the end of said welding strip to present said end of said welding strip at acute angle to the work, and means for reversing the position of said guide at the opposite ends of the path of movement of said welding head.

10. In an automatic electric arc welding apparatus in which the work constitutes one electrode and a metallic welding strip constitutes the other electrode, the combination of a track, a welding head, rollers carried by said head and adapted to support the latter on said track, means for propelling said head along said track, means on said head for feeding a welding strip to the work from said head while the latter is moving, so as to maintain the arc and supply welding material thereto, means including gearing for driving said feeding means from said rollers, and means for automatically controlling the speed of said propelling means whereby the speed of said feeding means is also controlled.

11. In an automatic electric arc welding apparatus in which the work constitutes one electrode and a metallic welding strip constitutes the other electrode, the combination of a track, a welding head, means for supporting said welding head on the track comprising a shaft carrying the welding head and pinions fixed on the ends of said shaft, means for propelling said welding head along the said track, means for feeding a welding strip to said head while the latter is moving along the track, and means whereby the shaft carrying said pinions drives said feeding means.

12. In an automatic electric arc welding apparatus in which the work constitutes one electrode and a metallic welding strip constitutes the other electrode, the combination of a welding head, means for propelling said head in a path along said work, means for feeding a welding strip to the work from said head while the latter is moving, and automatic means for controlling the action of said feeding means.

13. In an automatic electric arc welding apparatus in which the work constitutes one electrode and a metallic welding strip constitutes the other electrode, the combination of a welding head, means for propelling said head in a path along said work, mechanism on said head for feeding a welding strip to the work from said head while the latter is moving, mechanism on said head for automatically controlling the action of said feeding mechanism, and means for automatically controlling the propelling means.

14. In an automatic electric arc welding apparatus in which the work constitutes one electrode and a metallic welding strip constitutes the other electrode, the combination of a welding head, means on said head for feeding a welding strip toward and away from the work during the welding operation, first to close the welding circuit, then to draw the arc, then to continuously feed the welding strip to maintain the arc and supply welding material to be deposited upon the work, and at the completion of the weld to rupture the arc, means for propelling the welding head along the work during the welding operation, and means for timing the action of said feeding means with the action of said propelling means.

15. In an automatic electric arc welding apparatus in which the work constitutes one electrode and a metallic welding strip constitutes the other electrode, the combination of a welding head, means on said head for feeding the welding strip toward and away from the work during the welding operation, means for propelling the welding head and work relatively to each other during the welding operation, and means on the head for timing the action of said feeding means with respect to the action of said propelling means.

16. In an automatic electric arc welding apparatus in which the work constitutes one electrode and a metallic welding strip constitutes the other electrode, the combination of a welding head, means on said head for feeding a welding strip from said head toward and away from the work during the welding operation, means for propelling the welding head along the work during the welding operation, and means on said head for timing the action of said feeding means with respect to the action of said propelling means.

17. In an automatic electric arc welding apparatus in which the work constitutes one electrode and a metallic welding strip constitutes the other electrode, the combination of a welding head, means on said head for feeding a welding strip from the head to the work during the welding operation, means for reciprocating said welding head along the work during the welding operation, and means on said head for timing the action of said feeding means with respect to the action of said reciprocating means.

18. In an automatic electric arc welding apparatus in which the work constitutes one electrode and a metallic welding strip constitutes the other electrode, the combination of a welding head, means for feeding a welding strip to the work from said head, means for propelling the welding head along the work while said feeding means is operating, means for reversing the propelling means to change the direction of movement of said head, and means coöperating with said feeding means to maintain the latter in the proper feeding condition after the propelling means has been reversed.

19. In an automatic electric arc welding apparatus in which the work constitutes one electrode and a metallic welding strip constitutes the other electrode, the combination of a welding head, means for propelling said head in a path along said work, means on said head for feeding a welding strip to the work from said head while the latter is moving, mechanism whereby said feeding means is driven when said head is propelled, means for controlling the action of said feeding means, means for reversing the propelling means at the opposite ends of the path of movement of said welding head to change the direction of movement of the latter, and means whereby the action of said feeding means and its controlling means are maintained in proper relation to the direction of movement of said head when the propelling means thereof is reversed.

20. In an automatic electric arc welding apparatus in which the work constitutes one electrode and a metallic welding strip constitutes the other electrode, the combination of a welding head, means for propelling said welding head along the work, means on said head for feeding a welding strip from the head toward and away from the work, mechanism on said head for timing the action of said feeding means, devices whereby said feeding means and timing mechanism are driven when said head is propelled along the work, means for reversing said propelling means at the opposite ends of the path of movement of said welding head to reverse the direction of movement of the latter, and means whereby said driving devices of the feeding means and timing mechanism are adjusted, so as to maintain them in proper relation to the propelling means when the latter is reversed.

21. In an automatic electric arc welding apparatus in which the work constitutes one electrode and a metallic welding strip constitutes the other electrode, the combination of a welding circuit including a generator, said work and said welding strip, a welding head, means on said welding head for feeding said welding strip toward and away from the work, mechanism for timing said feeding means, means for propelling said welding head along the work, devices whereby said feeding means and timing mechanism are driven when said welding head is propelled along the work, a motor for driving said welding generator and also for driving said propelling means, means for reversing said propelling means at the ends of the path of movement of said welding head to reverse the direction of movement of the latter, and means whereby the feeding means and timing mechanism are adjusted at the ends of the path of movement of said welding head to maintain them in proper relation to each other and to the direction of movement of said welding head.

22. In an automatic electric arc welding apparatus in which the work constitutes one electrode and a metallic welding strip constitutes the other electrode, the combination of a welding head, means on said head for feeding a welding strip toward and away from the work during the welding operation, means controlling said feeding means, a timing device on said head for regulating the action of said controlling means, means for propelling said head, means for reversing said propelling means, means for driving said timing device, means whereby said driving means of the timing device is driven when said welding head is propelled, and means for reversing the driving means of the timing device when the propelling means is reversed so as to keep the timing device moving in the same direction during the back and forth movement of said welding head.

23. In an automatic electric arc welding apparatus in which the work constitutes one electrode and a metallic welding strip constitutes the other electrode, the combination of a welding head, means on the welding head for feeding a welding strip toward and away from the work, electro-magnetic means for controlling the action of said feeding means, a timing device for controlling said electro-magnetic means, means for propelling said head along the work, electro-magnetically operated means for reversing the propelling means at the opposite ends of the path of movement of said welding head, means whereby the movement of said head drives said timing means and also drives said welding strip feeding means, means whereby the direction of said timing means is reversed when the propelling means is reversed, and means whereby the circuit of the electro-magnetic controlling means for the feeding means is also reversed when said propelling means is reversed.

24. In an automatic electric arc welding apparatus in which the work constitutes one electrode and a metallic welding strip constitutes the other electrode, the combination of a welding head, means on said welding head for feeding a welding strip toward and away from the work, means for reciprocating the welding head and work relatively to each other, means for timing the action of said feeding means with respect to the action of said reciprocating means, means whereby the reciprocation of said head drives said feeding means and said timing means, and means for reversing the timing means each time the direction of movement of the welding head is changed, so as to maintain the timing means and feeding means in proper relation to their driving means to feed the welding strip.

25. In an automatic electric arc welding apparatus in which the work constitutes one electrode and a metallic welding strip constitutes the other electrode, the combination of a supporting structure, a track mounted on the supporting structure and divided into sections, a welding head for each section of track, means for reciprocating the welding heads back and forth along their track sections, and means on each welding head for feeding a welding strip therefrom to the work as the welding head is reciprocated.

26. In an automatic electric arc welding apparatus in which the work constitutes one electrode and a metallic welding strip constitutes the other electrode, the combination of a supporting structure adapted to be installed adjacent the work, tracks mounted on said supporting structure and divided into sections a welding head movable back and forth along each track section, means on each welding head for feeding a welding strip therefrom to the work, means for propelling the welding head, and means whereby said feeding means is driven when the welding head is propelled along the work.

27. In an automatic electric arc welding apparatus in which the work constitutes one electrode and a metallic welding strip constitutes the other electrode, the combination of a supporting structure adapted to be installed adjacent the work, tracks carried by said supporting structure and forming a track thereon, said track being divided into sections, a portable welding head for each section of track, each welding head comprising a casing, a shaft extending through the casing, a pinion on each end of the shaft adapted to engage and roll along the racks constituting the track, means within the casing for feeding a welding strip therefrom to the work, means for propelling the casing back and forth along a track section, and means in the casing whereby the feeding means is driven by said shaft carrying the pinions as the casing is propelled along the track section.

28. A welding head of the class described comprising a casing, a welding strip feeding mechanism within said casing, a timing mechanism within said casing for controlling said welding strip feeding mechanism, and means in said casing for driving said feeding mechanism and for driving said timing mechanism.

29. A portable welding head of the class described comprising a casing, a feeding mechanism in said casing for feeding a welding strip toward and away from the work, a timing mechanism in said casing for controlling the action of said feeding mechanism and means for mechanically connecting said casing to a propelling means.

30. A portable welding head of the class described comprising a casing, mechanism in said casing for automatically feeding a welding strip toward and away from the work, a timing mechanism in said casing for automatically controlling the action of said feeding mechanism, a shaft passing through said casing, means whereby the shaft is mechanically connected to said feeding mechanism and to said timing mechanism to drive the same, and supporting rollers carried by said shaft, said rollers driving said shaft when the welding head is propelled.

31. A portable welding head of the class described comprising a casing, a shaft extending through the casing, supporting rollers fixed on the outer ends of said shaft, a feeding mechanism for feeding a welding strip, and means whereby said feeding mechanism is driven by said shaft when the welding head supported by said rollers is propelled.

32. A portable electric welding apparatus comprising a welding head including a casing, a shaft mounted in the casing and projecting therefrom, a pinion on the outer end of said shaft, a fixed rack with which said pinion meshes, a feeding mechanism in said casing for feeding a welding strip, means whereby said feeding mechanism is driven by the rotation of said shaft, and means for propelling said casing whereby said pinion is caused to rotate said shaft to drive the feeding mechanism.

33. A portable electric welding mechanism comprising a welding head including a casing, a shaft journaled in said casing and projecting therefrom, a toothed pinion carried by said shaft, a toothed rack with which said pinion meshes, a feeding mechanism in the casing for feeding a welding strip, a timing mechanism in the casing for controlling the feeding mechanism, means for propelling said head including the casing, and means whereby said feeding mechanism and timing mechanism are driven by said shaft when the head is propelled.

34. In an automatic electric arc welding apparatus in which the work constitutes one electrode and a metallic welding strip constitutes the other electrode, the combination of a supporting structure adapted to be positioned adjacent the work, a track mounted on said supporting structure, a welding head, means for propelling said welding head along said track, and means for feeding a strip of welding material from said head to said work while said head is moving, so as to maintain the arc and to supply welding material to be deposited on the work.

35. In an automatic electric arc welding apparatus in which the work constitutes one electrode and a metallic welding strip constitutes the other electrode, the combination of a supporting structure adapted to be positioned adjacent the work, a track mounted on said supporting structure, a welding head, means for propelling said welding head along said track, means for feeding a strip of welding material from said head to said work while said head is moving, so as to maintain the arc and to supply welding material to be deposited on the work, and means for automatically controlling said feeding means.

36. In an automatic electric arc welding apparatus in which the work constitutes one electrode and a metallic welding strip constitutes the other electrode, the combination of a supporting structure adapted to be positioned adjacent the work, a track mounted on said supporting structure, a welding head, means for propelling said welding head along said track, mechanism for feeding a strip of welding material toward and away from said work while said head is moving, so as to complete the welding circuit, draw the arc, maintain the arc, supply welding material thereto, and rupture the arc, and means for controlling said feeding mechanism.

37. In an automatic electric arc welding apparatus in which the work constitutes one electrode and a metallic welding strip constitutes the other electrode, the combination of a supporting structure adapted to be positioned adjacent the work, a track mounted on said supporting structure, a welding head, means for propelling said welding head along said track, mechanism for feeding a strip of welding material toward and away from said work while said head is moving, a timing mechanism for controlling the action of said feeding mechanism, and means for controlling the speed of said feeding mechanism.

38. In an automatic electric arc welding apparatus in which the work constitutes one electrode and a metallic welding strip constitutes the other electrode, the combination of a welding head, means for propelling said welding head along said work, mechanism for feeding a strip of welding material from said head to said work while the head is moving so as to maintain the arc to supply welding material to be deposited on the work, mechanism for controlling the action of said feeding mechanism, and mechanism for controlling the speed of said feeding mechanism.

39. In an automatic electric arc welding apparatus in which the work constitutes one electrode and a metallic welding strip constitutes the other electrode, the combination of a welding head, means for propelling said welding head along said work, mechanism for feeding a strip of welding material from said head to said work while said head is moving, and means controlled by the current flowing in the welding circuit for controlling the rate at which said feeding mechanism supplies the welding strip to the arc.

40. In an automatic electric arc welding apparatus in which the work constitutes one electrode and a metallic welding strip constitutes the other electrode, the combination of a welding circuit including a welding current generator, the work and said welding strip, a welding head, means for propelling said welding head along said work, means for feeding a strip of welding material from said head to said work while said head is moving, so as to maintain the arc and to supply welding material to be deposited on the work, and means whereby the current flowing in said welding circuit automatically regulates the speed at which said welding strip is fed to the arc, so as to maintain an equilibrium between the rate of welding strip feed and the rate at which said strip is fused.

41. In an automatic electric arc welding apparatus in which the work constitutes one electrode and a metallic welding strip constitutes the other electrode, the combination of a welding circuit including a welding current generator, the work and said welding strip, a welding head, means for propelling said welding head along said work, means for feeding a strip of welding material from said head to said work while said head is moving, and means for driving said welding generator and said propelling means.

42. In an automatic electric arc welding apparatus in which the work constitutes one electrode and a metallic welding strip constitutes the other electrode, the combination of a welding circuit including a welding current generator, the work and said welding strip, a welding head, means for propelling said welding head along said work, means for feeding a strip of welding material from said head to said work while said head is moving, means whereby said propelling means drives said feeding means, and means for automatically regulating the speed of said feeding means.

43. In an automatic electric arc welding apparatus in which the work constitutes one electrode and a metallic welding strip constitutes the other electrode, the combination of a welding circuit including a welding current generator, the work and said welding strip, a welding head, means for propelling said welding head along said work, means for feeding a strip of welding material from said head to said work while said head is moving, so as to maintain the arc and to supply welding material to be deposited on the work, means whereby said propelling means drives said feeding means, and a common motive power driving said welding current generator and said propelling means and responsive in speed to changes in the current flowing across the arc between the welding strip and work.

44. In an automatic electric arc welding apparatus in which the work constitutes one electrode and a metallic welding strip constitutes the other electrode, the combination of a welding circuit including a welding generator, the work, and said welding strip, a welding head, means for propelling said welding head along said work, mechanism on said head for feeding said strip of welding material to said work while said head is moving, mechanism on said head for controlling the action of said feeding mechanism, and a common motive power for driving both the welding generator and said propelling means, the speed of said motor being responsive to changes in the amperage of the arc.

45. In an automatic electric arc welding apparatus in which the work constitutes one electrode and a metallic welding strip constitutes the other electrode, the combination of a welding circuit including a welding generator, the work, and said welding strip, a welding head, means for propelling said welding head along said work, mechanism for feeding a strip of welding material toward and away from said head while said head is moving, so as to close the welding circuit, draw an arc, maintain the arc and supply welding material to be deposited on the work, and finally to rupture the arc, mechanism for timing the action of said feeding mechanism, means whereby said propelling means drives said feeding mechanism and said timing mechanism, and mechanism whereby the speed of the feeding mechanism is controlled by the current flowing in said welding circuit and across said arc to maintain an equilibrum between the rate at which said welding strip is fed to the arc and the rate at which it is fused.

46. In an automatic electric arc welding apparatus in which the work constitutes one electrode, and a metallic welding strip constitutes the other electrode, the combination of a welding circuit including a welding generator, the work, and said welding strip, a welding head, means for propelling said welding head along said work, mechanism for feeding a strip of welding material toward and away from said head while said head is moving, so as to close the welding circuit, draw an arc, maintain the arc and supply welding material to be deposited on the work, and finally to rupture the arc, mechanism for timing the action of said feeding mechanism, means whereby said propelling means drives said feeding mechanism and said timing mechanism, and an electric motor for driving both said welding generator and said propelling means and responsive in speed to changes in the amperage of the current in said welding circuit whereby said feeding mechanism is regulated and an equilibrium is maintained between the rate at which the welding strip is fed to the arc and the rate of fusion of said welding strip.

In testimony whereof I affix my signature.

HARRY D. MORTON.